United States Patent [19]
Renfro

[11] Patent Number: 4,493,336
[45] Date of Patent: Jan. 15, 1985

[54] HYDRAULIC CHOKING DEVICE

[76] Inventor: Wesley E. Renfro, 2804 Broadmoor, Houma, La. 70360

[21] Appl. No.: 412,131

[22] Filed: Aug. 27, 1982

Related U.S. Application Data

[63] Continuation-in-part of Ser. No. 160,972, Sep. 26, 1980, abandoned.

[51] Int. Cl.$^3$ .......................... F16K 1/08; F16K 1/38; F16K 1/42; F16K 31/16
[52] U.S. Cl. ...................................... 137/312; 251/58; 251/122; 251/214; 251/363; 251/14; 74/424.8 VA; 74/424.8 NA
[58] Field of Search ............... 251/122, 130, 319, 360, 251/363, 214, 58, 14; 137/797, 312; 74/216.3, 424.8 VA, 424.8 NA, 625; 138/45

[56] References Cited

U.S. PATENT DOCUMENTS

| | | | |
|---|---|---|---|
| 2,061,852 | 11/1936 | Schweitzer | 251/122 |
| 2,324,571 | 7/1943 | Fitz | 251/130 X |
| 2,327,980 | 8/1943 | Bryant | 74/625 X |
| 2,614,795 | 10/1952 | Allen | 251/122 X |
| 2,843,152 | 7/1958 | Laird et al. | 137/797 |
| 2,914,088 | 11/1959 | Beaman et al. | 251/266 X |
| 2,964,063 | 12/1960 | Guenther | 137/559 X |
| 3,307,574 | 3/1967 | Anderson | 137/312 |
| 3,466,945 | 9/1969 | McNeal, Jr. | 74/625 |
| 3,521,853 | 7/1970 | Gillis et al. | 251/122 |
| 4,047,695 | 9/1977 | Cleveland et al. | 251/122 |
| 4,295,384 | 10/1981 | Brandt et al. | 74/424.8 NA |

FOREIGN PATENT DOCUMENTS

| | | | |
|---|---|---|---|
| 295651 | 8/1928 | United Kingdom | 251/360 |
| 1288028 | 9/1972 | United Kingdom | 251/122 |

Primary Examiner—Arnold Rosenthal
Attorney, Agent, or Firm—William David Kiesel

[57] ABSTRACT

A hydraulic choking device for use in controlling fluid flow from an oil or gas well comprising choke body assembly and a choke actuator assembly having a choke actuator assembly with improved sealing means and choke plug construction, as well as a unique choke actuator drive means.

7 Claims, 8 Drawing Figures

HYDRAULIC CHOKING DEVICE

RELATED APPLICATION

This application is a continuation-in-part of U.S. Pat. application Ser. No. 160,972 now abandoned, entitled "Hydraulic Choke Device" filed by the inventor herein on Sept. 26, 1980, specific mention being made for the purpose of obtaining benefit of its filing date.

BACKGROUND OF THE INVENTION

1. Field of the Invention.

This invention relates in general to high pressure fluid choke devices and, more particularly, to choke devices designed for use on oil and gas wells.

2. Prior Art.

One of the most potentially dangerous and expensive situations faced by the petrochemical industry has been prevention of well blowouts. In order to prevent well blowouts, much research and development time and money has been expended to design high pressure fluid choke devices. The most popular devices are those presently marketed by NL Industries, Inc. as described in their publication NLS 4881-580, Dresser Industries as described in their publication entitled, "When You Are Caught Under Pressure . . . Patterson Adjustable Choke".

In the pending application indicated above, applicant disclosed a hydraulic choke device that substantially overcame the prior art difficulties. The design of this invention improves further the backup drive assembly, reduces the size of the choke device to allow its use in more applications, increases wear life of the wear plug, decreases further the down time during repairs by providing a removable packing gland which allows changing of all pressure packing without complete disassembly of the choke actuator assembly, and improving the seal between the wear plug and ram. Also, a visual position indicator is located on the acutator to provide operator with a visual means of knowing what orifice size is being used.

SUMMARY OF THE INVENTION

Therefore, it is an object of this invention to provide an improved hydraulic choke which improves the backup drive assembly by utilizing a 3-pitch single thread worm gearing that allows the actuator to lock itself when power from the hydraulic motor or manual override is not being applied.

Another object of this invention is to provide a simple two a gear arrangment of a hydraulic choke device which allows substantial size reduction in the actuator.

Still another object of this invention is to increase the wear plug life of a hydraulic choke device through a unique ball screw ram, ball nut and wear plug combination.

A further object of this invention is to provide a hydraulic choke device which allows more rapid replacement of the actuator packing.

A still further object of this invention is to provide a hydraulic choke device having improved means to position the wear plug in relation to the ram.

Still other objects and advantages of this invention will become apparent from the ensuing descriptions of the invention. Accordingly, a hydraulic choking device to be installed on a high pressure fluid well member to control flow of fluids from the wells which comprises:

(a) a choke housing assembly having a choke housing body provided with a passageway through which the high pressure fluid can pass;

(b) a choke actuator assembly having a choke actuator body attached to the choke housing body and having a choke plug assembly extendable into the choke housing body passageway to seal the passageway; and, (c) a drive assembly attached to the choke actuator assembly comprising:
  (i) means to rotate worm gears, and,
  (ii) a ball screw assembly having:
    1. A ball screw enclosed within a drive assembly housing and attached to the choke plug assembly and provided with exterior helical grooves positioned opposite aligned helical grooves formed in a bearing housing to form a helical passageway into which are ball bearings
    2. Means for engagement of said worm gears to rotate said ball screw.

PREFERRED EMBODIMENTS OF THE INVENTION

Figure 1:
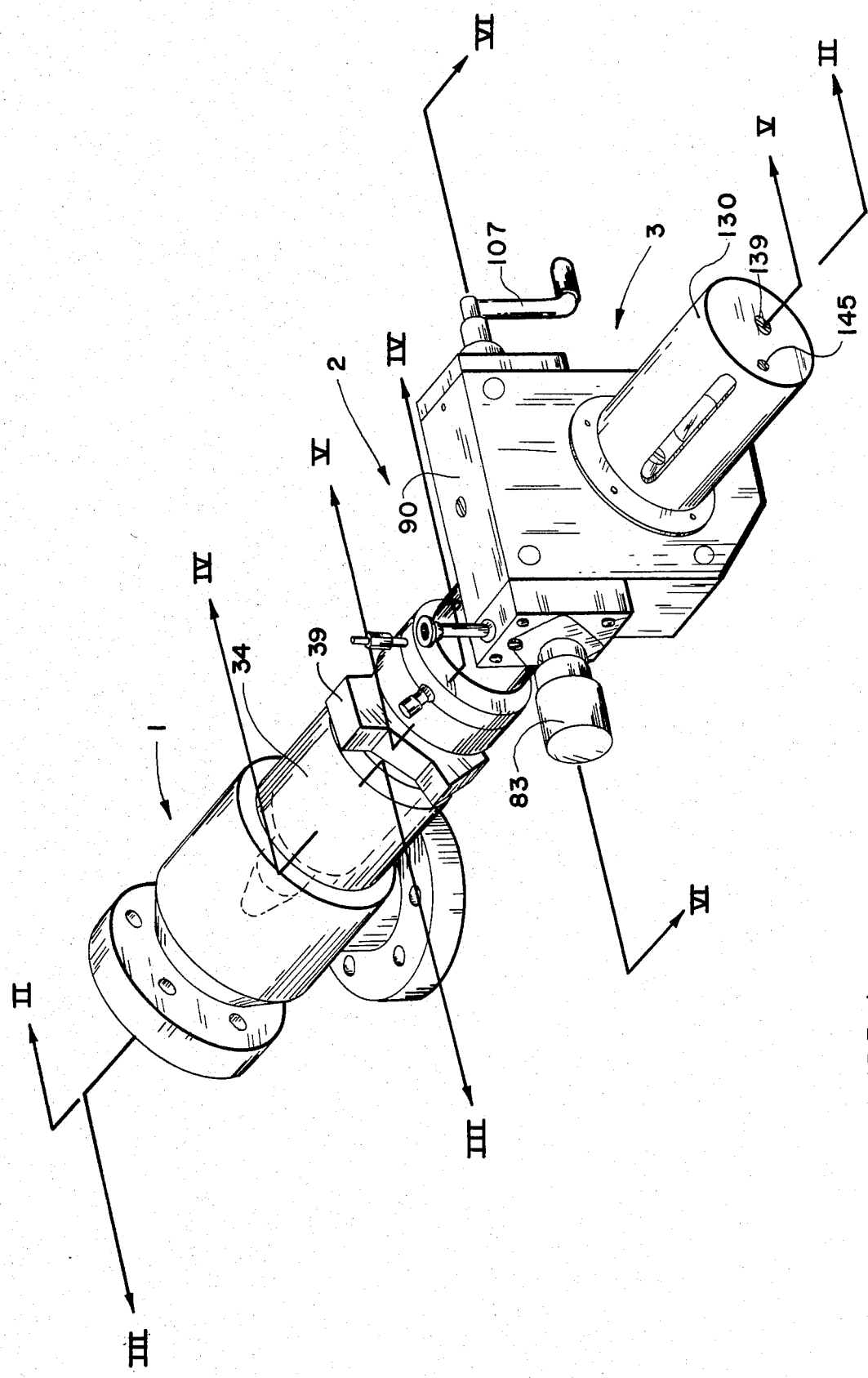
FIG. 1 is a three-dimensional view of a preferred embodiment of the hydraulic choke device of this invention.

Referring to FIG. 1 a preferred embodiment of a hydraulic choke of this invention is illustrated comprising broadly a choke housing assembly, denoted generally by the numeral 1, choke actuator assembly, denoted generally by the numeral 2, and drive assembly, denoted generally by the numeral 3.

Figure 3:
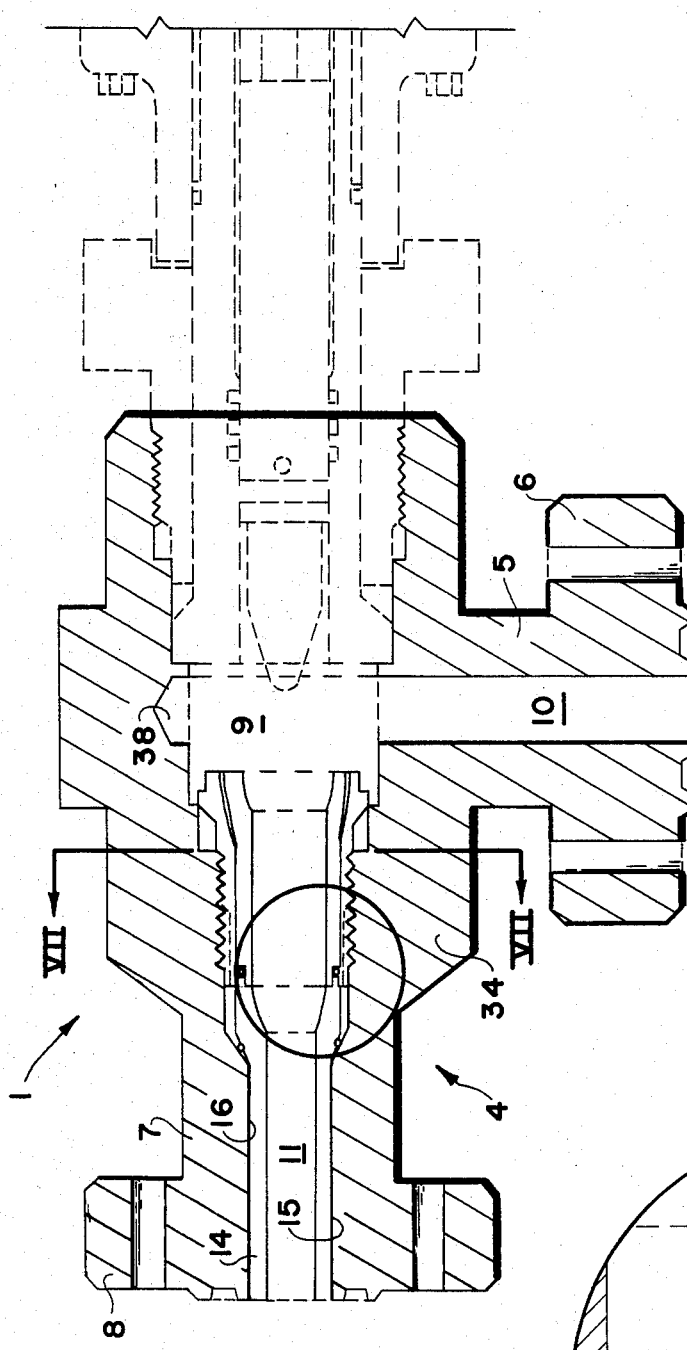
FIG. 3 is a cross-sectional view taken along lines III—III of FIG. 1 of a preferred embodiment of the choke body assembly.
Figure 3A:
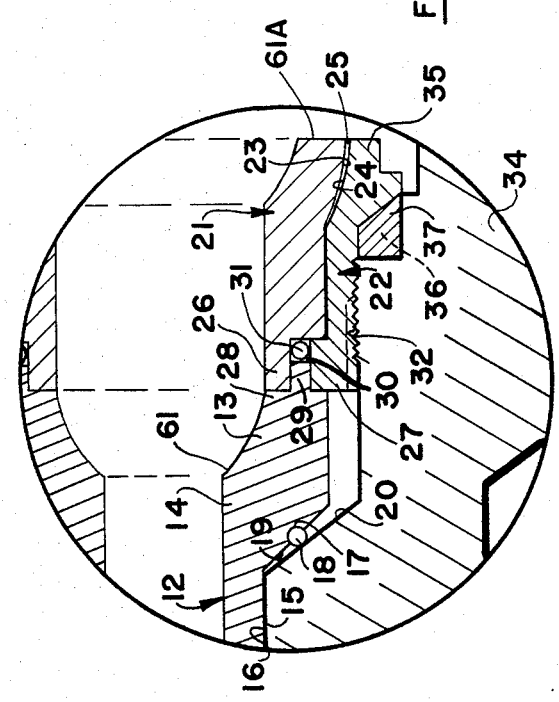
FIG. 3A is an enlarged view of the circled area shown in FIG. 3.

Turning now to FIG. 3 and 3A, choke body assembly 1 comprises choke housing body 4 having a lower stud member 5 having flanged end 6 for attachment to a gas well flow line (not shown). Body 4 is also provided with a side stud member 7 having flanged end 8 for attachment to the downstream side of the gas well flow line. Body 4 has center cavity 9 connecting flange passageways 10 and 11 which allows gas to flow through body 4. Within passageway 11 is lower wear sleeve 12 having flared end section 13 facing center cavity 9 and end section 14 whose exterior wall surface 15 is shaped to fit flushly next to flange end wall section 16. Flared end 13 is provided with O-ring notch 17 wherein O-ring 18 is placed to form a seal between flared end wall surface 19 and housing wall surface 20. Also within passageway 11 is upper wear sleeve 21 and adapter wear sleeve 22 each having adjacent wall surfaces 23 and 24, respectively, preferably bonded together with epoxy 25 or similar sealant. Both upper wear sleeve 21 and adapter wear sleeve 22 have end members 26 and 27, respectively, which abut against lower wear sleeve end 28 and are positioned in relationship to lower wear sleeve stud 29 to form on O-ring notch 30 into which O-ring 31 fits to form a sealing arrangement between ends 26, 27 and 28.

Figure 7:
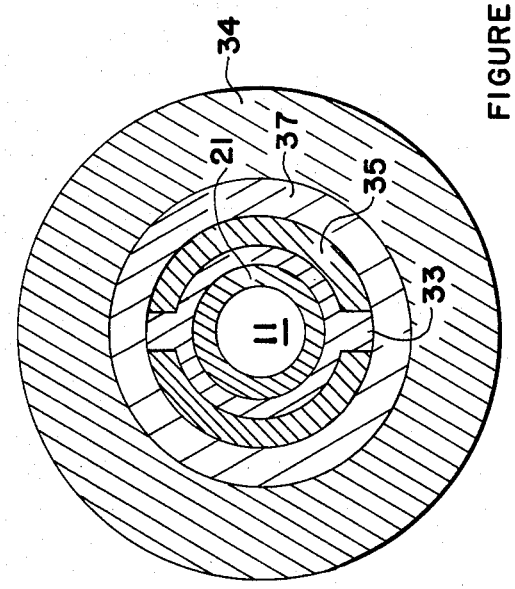
FIG. 7 is a cross-sectional view taken along lines VII—VII of FIG. 3.

In a preferred embodiment as illustrated in FIG. 3A and 7 adapter wear sleeve 22 has threads 32 which screw into mating adapter wear sleeve threads 33 to energize Bridgeport seal 37.

In another preferred embodiment choke body wall 34 is provided conial shaped cavity 38 opening into center cavity 9 and positioned directly opposite flange passageway 10 to receive the gas flow exiting passageway 10 thus creating a less turbulent gas flow stream into passageway 11.

Figure 2:
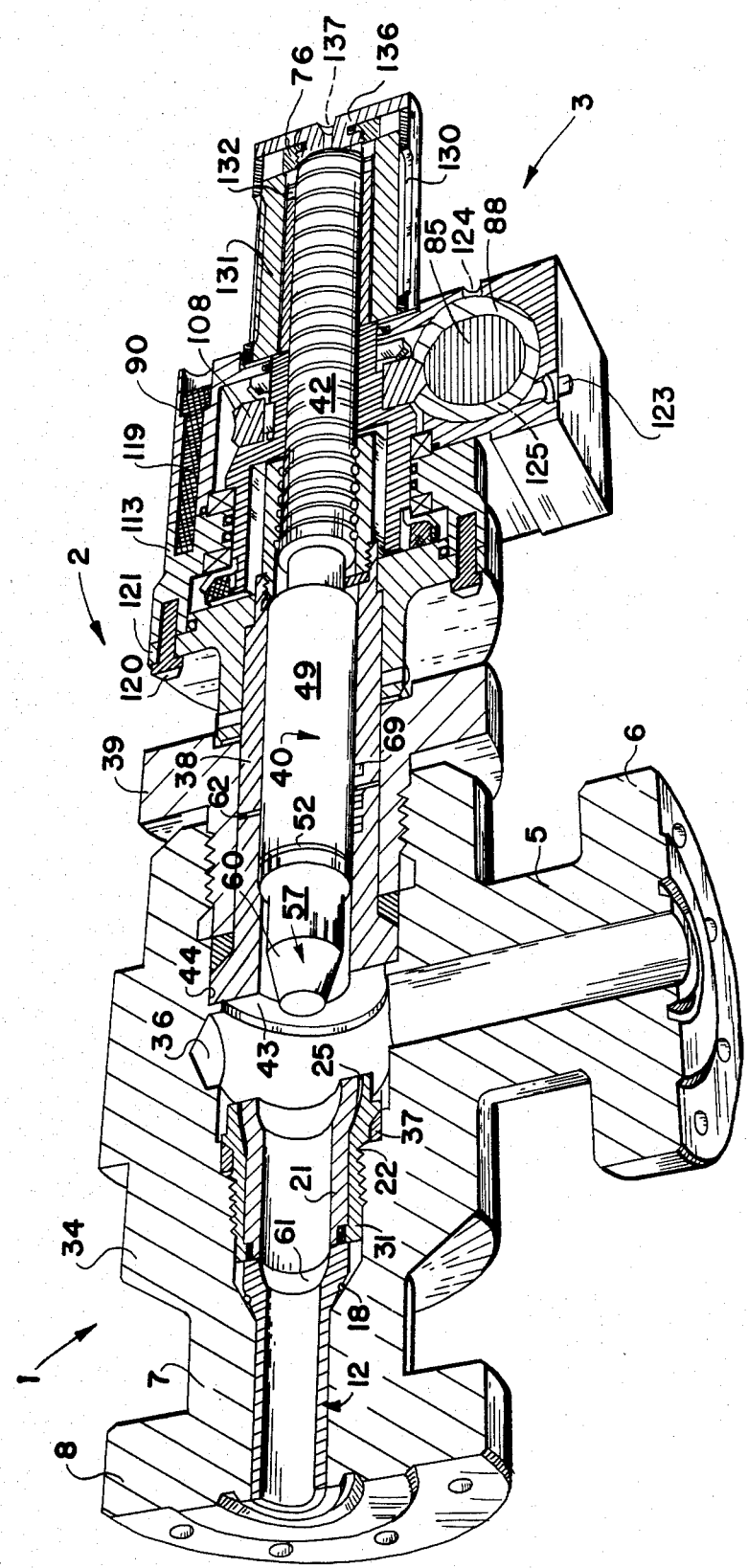
FIG. 2 is a cutaway three-dimensional view taken along lines II—II of FIG. 1 of a preferred embodiment of the hydraulic choke device of this invention.
Figure 4:
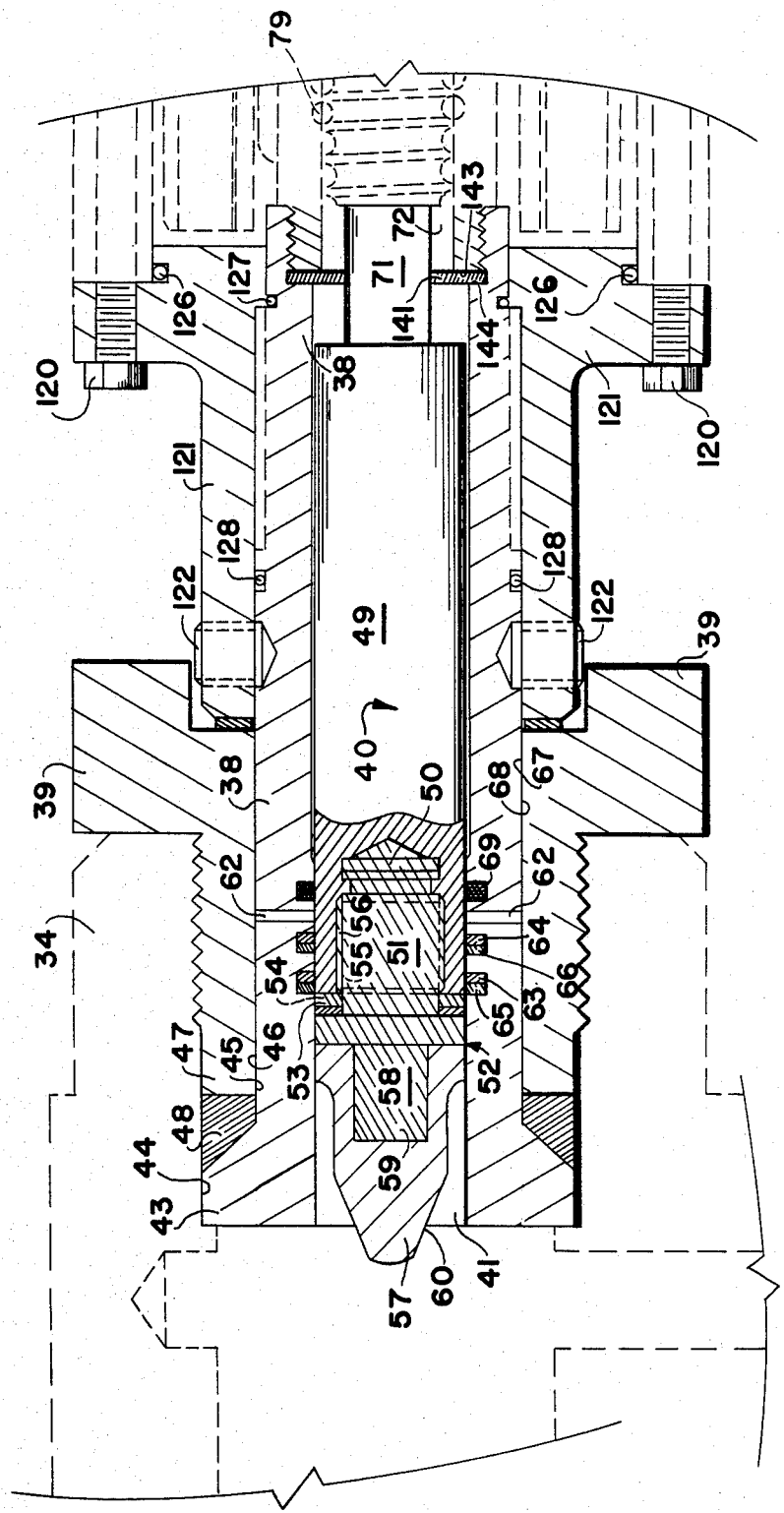
FIG. 4 is a cross-sectional view taken along lines IV—IV of FIG. 1 of a preferred embodiment choke plug assembly.

Referring now to FIGS. 2 and 4 the preferred embodiments of choke actuator assembly 2 are shown. Assembly 2 comprises choke actuator body 38 attached to choke housing body wall 34 by bonnet choke nut 39, choke plug assembly 40 positioned in choke actuator body cavity 41 and attached to ball screw assembly 42 of drive assembly 3.

Choke actuator body 38 is provided with end section 43 having a cross-sectional shape to fit flushly with choke body wall surface 44 when pressed into position as shown. Further securing body 38 in position is bonnet choke nut 39 having a center passageway through which body 38 fits so that wall surfaces 45 and 46 are flush next to one another in sealing fashion. Bonnet choke nut 39 also comprises stud section 47 which is serviced in position or pressed flushly between choke actuator body 38 and choke body wall 34 as shown to form a sealing arrangement. To further prevent gas entering center cavity 9 from escaping past choke actuator body end section 43, seal 48 is fit into the circular cavity formed by choke actuator body end section 43, choke body wall surface 44 and stud section 47. In a preferred embodiment choke actuator body 38 is provided with vent openings 62 which allows any gas which might escape past high pressure seals 63 and 64 and back-up rings 65 and 66 to flow between choke actuator body outer wall surface 67 and bonnet choke nut interior wall surfaces 68 to the outside environment rather than traveling into the drive assembly 3. In a more preferred embodiment third seal ring 69 is positioned after vent openings 62 as shown to further prevent flow of the gas into drive assembly 3.

Choke plug assembly 40 comprises rear plug body 49 having forward cavity 50 into which shank 51 of choke plug 52 is positioned and secured by set screws 53 screwed through rear plug body threaded openings 54. In a preferred embodiment rear plug body cavity 50 is provided left-handed threads 55 which mate with threads 56. In another preferred embodiment choke plug 52 has an outer cover member 57 constructed from tungsten carbide and a rear cavity 58 into which choke plug stud 59 is silver brazed to secure outer cover member 57 to choke plug 52. Outer cover member 57 is shaped so that its wall surface 60 will abutt against upper wear sleeve end 61 when cover members 57 is seated in passageway 11.

Figure 5:
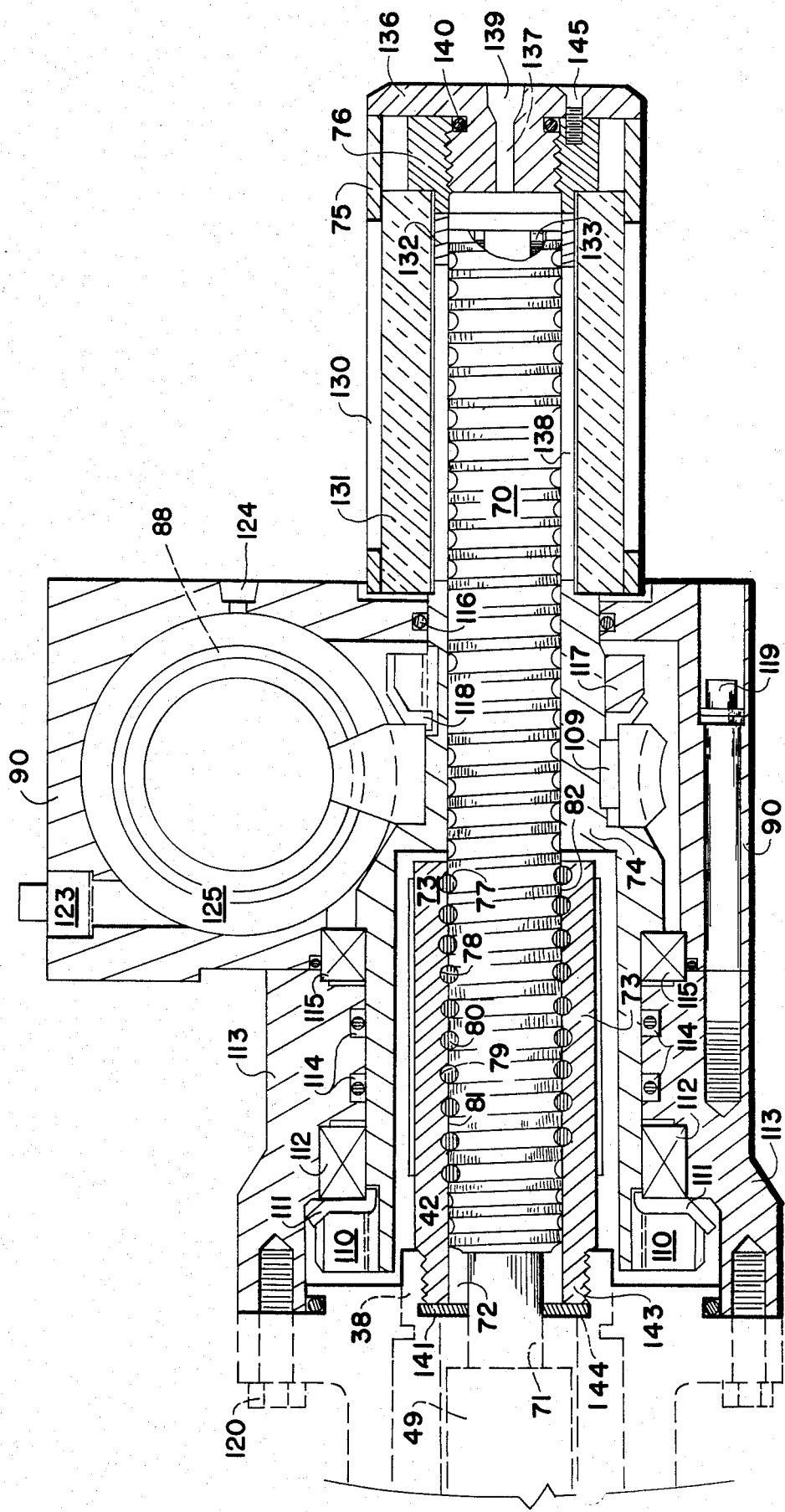
FIG. 5 is a cross-sectional view taken along lines V—V of FIG. 1 of a preferred embodiment of the choke actuator assembly.

Turning now to FIGS. 4 and 5, ball screw assembly 42 comprises ball screw 70 fixedly connected to rear plug body 49 by shaft 71 and fitting when retracted as shown in cavity 72 formed by bearing housing 73 threaded to choke actuator body 38, inner housing 74, rear outer cover 75, and stop plug 76. Ball screw 70 is provided with exterior helical grooves 77 which when positioned opposite helical grooves 78 of bearing housing 73 form a helical passageway 79 to house ball bearings 80 which separate helical ridges 81 and 82 from one another as shown, and which as explained hereinafter permit ball screw 70 to move back and forth.

In a preferred embodiment shaft 71 is heat treated to allow it to flex when wear plug 52 is initially struck by gas flowing through cavity 9. In another preferred embodiment wiper plate 141 is held in position between bearing housing end 143 and choke actuator body shoulder surface 144 and extends perpendicularly therefrom to be a position adjacent shaft 71 in order to keep foreign material from getting to ball screw 70.

Figure 6:
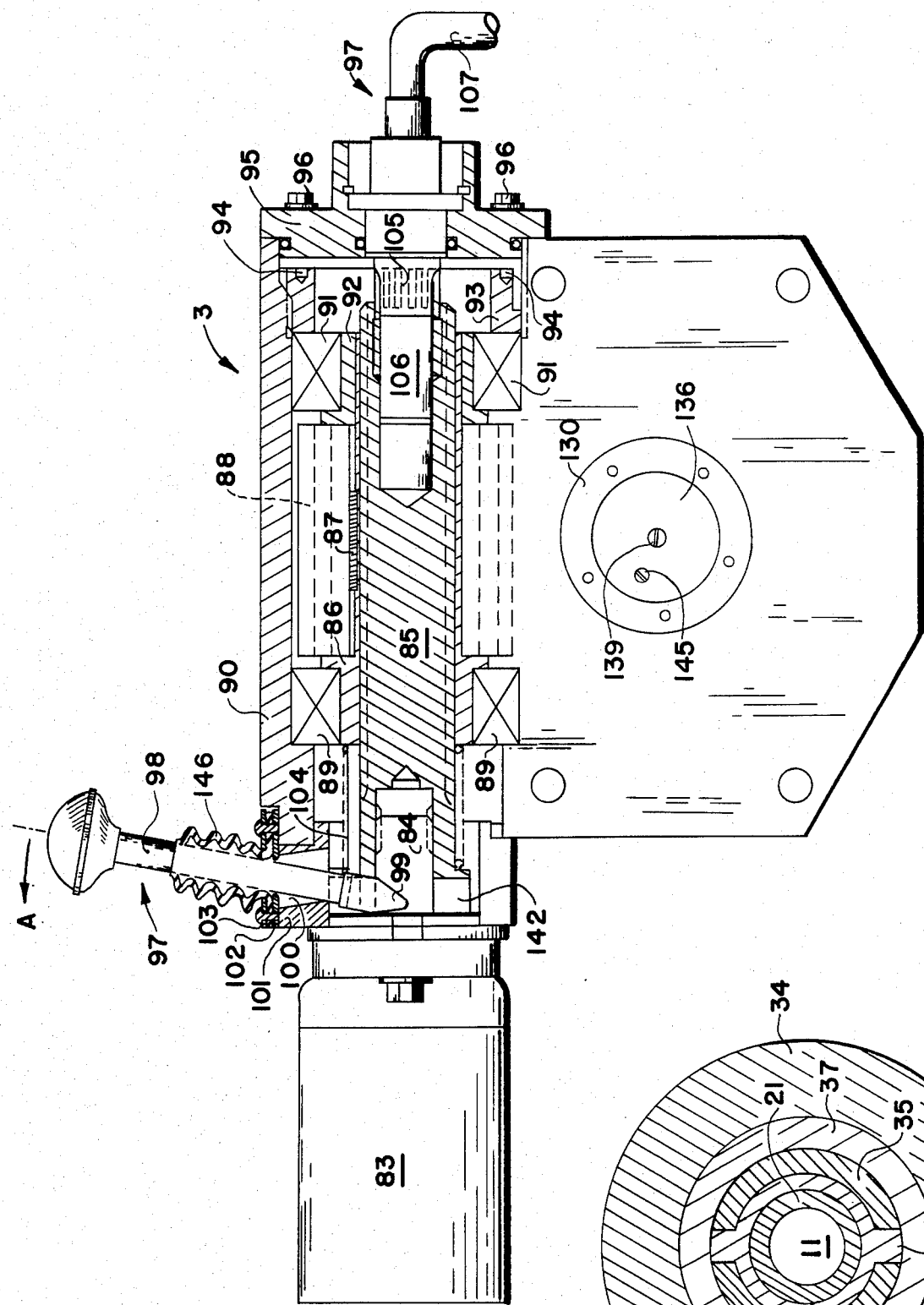
FIG. 6 is a cross-section view taken along lines VI—VI of FIG. 1 of a preferred embodiment of the drive assembly having a dual hydraulic and manual drive assembly.

In a preferred embodiment drive assembly 3 as shown in FIGS. 2, 5 and 6 comprises hydraulic driven motor 83 with extendable shaft 84 fitting to shaft spline 85 positioned in the axial channel of worm drive sleeve 86 and having key 87 fitting to engage worm gear 88 in a conventional manner. Also in conventional manner bearing 89 are positioned between sleeve 86 and gear case housing 90. In like manner as shown bearings 91 are positioned between bearing sleeve 92 and gear case housing 90. Also holding each bearing 91 in position is adapter ring 93 secured to gear case housing 90 by set screw 94 and to end gear case cap 95 by bolts 96.

In a preferred embodiment worm gear 88 can be manually turned by manual drive assembly 97. In this embodiment, gear shift lever 98 is pivotly attached by pin roll 99 to throw out bushing 142 and extends through opening 100 of motor mounting adapter plate 101 and plate boot 102 and plate boot clamp 103 which hold flexible rubber hose 146. When lever 98 is shifted in direction A as shown by the arrow in FIG. 6, throw out bushing 142 is pushed in the opposite direction causing shaft spline 85 to disengage from motor shaft 84 and causing shaft spline 85 to compress spring 104 and move to engage spline 105 of crank spline shaft 106 attached to crank handle 107. In this position handle 107 can then turn worm gear 88. Preferably, spline 105 will not engage shaft spline 85 until shaft spline 85 is completely disengaged from hydraulic motor shaft 84 so that handle 107 can not accidentally be turned by motor 83.

As seen in FIGS. 5 and 6 worm gear 88 is in rotation engagement with ball screw assembly worm gear 108 which is attached to inner housing 74 by key 109. Inner housing 74 is secured in rotatable position on one side by bearing lock nut 110, bearing lock washer 111, deep groove bearing 112 fitted in aft ball screw housing 113, high pressure seals 114 also fitted in housing 113, and by deep groove bearing 115 fitted into housing 113 and gear case housing 90 as shown in FIG. 5. Inner housing 74 is secured on the opposite side by high pressure seal 116 fitted in gear case housing 90, bearing lock nut 117, and bearing lock washer 118 as shown.

Turning back to FIGS. 2, 4 and 5 gear case housing 90 is fixedly attached to aft ball screw housing 113 by socket screw 119. In turn cap screws 120 fixedly attached aft ball screw housing 113 to center housing 121 that is attached by set screws 122 to choke actuator body 38 to form a rigid outer housing for ball screw assembly 42. In a preferred embodiment gear case housing 90 is provided with openings 123 and 124 having threaded ends in which can be screwed sealing plugs. Openings 123 and 124 extend into shaft spline cavity 125 to allow lubricants to be poured into cavity 125 to lubricate worm gears 88 and 108. In addition to the deep groove bearings 112 and 115, high pressure seals 114 and 116, O-rings 126, 127, and 128 are positioned so as to prevent lubricant leakage from cavity 125.

In another preferred embodiment rear outer cover 75 is provided with slit 130 and pressure sight glass 131 fitted over slit 130 to allow viewing of ball screw indicator pin 132 attached to the end of ball screw 70 by set screws 133. Stop plug 76 is held in position by end cap 136 attached to rear outer casing 75 by screws (not shown and to stop plug 76 by screw 145. End cap 136 is provided with opening 137 through which clear lubricating fluid can be added to indicator cavity 138. Pipe plug 139 seals opening 137 as desired and O-ring 140 prevents leakage of the fluid from cavity 138.

In operation motor 83 drives shaft spline 85 which rotates worm gear 88 and in turn worm gear 108, and inner housing 74. The rotation of ball screw 70 in conjunction with ball bearings 80 cause ball screw 70 to rotatingly move in and out of ball screw cavity 72. This feature is particularly preferred because the rotation of wear plug cover member 71 allows and distributes equal wear 360° around its surface resulting in substantial wear life. As ball screw 70 moves forward choke plug assembly 40 moves into cavity 9. If ball screw 70 is extended forward to its maximum outer cover member wall surface 60 will abutt against upper wear sleeve end 61 preventing the flow of gas from passageway 10 to passageway 11.

There are of course many alternate embodiments of this invention not specifically mentioned but which are intended to be included within the scope of the inventor as defined by the following claims:

What I claim is:

1. A hydraulic choking device to be installed on a high pressure fluid well member to control flow of fluids from wells which comprises:
    (a) a choke housing assembly having:
        (i) a choke housing body provided with an exit passageway having an exit opening at one end and a ball nose plug entrance opening at its opposite end, the passageway being provided with a cavity in its sidewall perpendicular to the passageway, and provided with a shoulder stud perpendicularly attached to the housing body and having a fluid entry passageway opening into the housing body passageway directly opposite the cavity, the shoulder stud being attachable to the fluid well member for the fluid entry passageway to receive the well fluids,
        (ii) a wear sleeve assembly attached to the choke housing body passageway sidewall at the exit opening end and having an entry wear sleeve and a down stream wear sleeve, the entry wear sleeve having an outwardly flared opening to receive the fluids and direct them through the down stream wear sleeve which is also provided with a flared opening to receive the fluids and direct them through an opening of a ball nose plug seat;
    (b) a choke actuator assembly having:
        (i) a choke actuator body sealingly attached to said choke housing body and having a choke actuator passageway extending there through and aligned with said choke housing exit passageway,
        (ii) sealing means positioned in circular grooves cut in the interior wall surface of said choke actuator body and extending out in sealing contact with said choke plug; and,
    (c) a drive assembly having means to engage said choke plug body to move said choke plug in sealing contact with said wear sleeve assembly.

2. A hydraulic choking device according to claim 1 wherein said choke body comprises vent openings extending there through and positioned between said sealing means.

3. A hydraulic choking device according to claim 1 wherein said choke actuator assembly comprises a bonnet bolt nut fitting flushly over said choke actuator body, said bonnet bolt nut having a threaded end which screws into a threaded section of said choke housing body.

4. A hydraulic choking device according to claim 3 where a second sealing means is positioned about said choke actuator body and between one end of said bonnet bolt nut and a raised shoulder section of said choke actuator body facing into said exit passageway, said second sealing means extending into sealing contact with said choke housing body.

5. A hydraulic choking device according to claim 1 wherein said choke plug comprises a shank threadingly attached to a threaded cavity of said choke plug body.

6. A hydraulic choking device according to claim 5 wherein said drive assembly means comprises a ball screw assembly attached to said choke plug body to rotate said choke plug body in one direction and wherein said shank is threaded into said choke plug body in one direction and wherein said shank is threaded into said choke plug body cavity in the opposite direction.

7. A hydraulic choking device according to claim 1 wherein said drive assembly comprises:
    (a) means to rotate worm gears; and,
    (b) a ball screw assembly having:
        (i) a ball screw attached to said choke plug assembly and enclosed within a drive assembly housing and provided with exterior helical grooves positioned opposite aligned helical grooves formed in a bearing housing to form a helical passageway into which are ball bearings,
        (ii) means for engagement of said worm gears to rotate said ball screw.

* * * * *